United States Patent [19]

Van Beek

[11] Patent Number: 4,798,480
[45] Date of Patent: Jan. 17, 1989

[54] BEARING SYSTEM WITH ACTIVE RESERVOIR BETWEEN TWO AXIALLY SPACED HYDRODYNAMIC BEARINGS

[75] Inventor: Anton Van Beek, Zoetermeer, Netherlands

[73] Assignee: U.S. Philips Corporation, New York, N.Y.

[21] Appl. No.: 108,405

[22] Filed: Oct. 13, 1987

[30] Foreign Application Priority Data

Oct. 13, 1986 [NL] Netherlands .......................... 8602565

[51] Int. Cl.[4] ............................................. F16C 32/06
[52] U.S. Cl. .................................... 384/114; 384/120
[58] Field of Search ............... 384/100, 114, 118, 120, 384/292, 291, 286, 283; 310/90

[56] References Cited

U.S. PATENT DOCUMENTS

| | | | |
|---|---|---|---|
| 1,999,266 | 4/1935 | Warlop | 384/292 |
| 3,112,140 | 11/1963 | Adams | 384/120 |
| 3,132,906 | 5/1964 | Sternlicht | 384/114 |
| 4,222,617 | 9/1980 | Romberg | 384/100 X |
| 4,596,474 | 6/1986 | Van Roemburg | 384/100 X |

Primary Examiner—Stuart S. Levy
Assistant Examiner—Thomas R. Hannon
Attorney, Agent, or Firm—Brian J. Wieghaus

[57] ABSTRACT

A bearing system comprises two hydrodynamic bearings by means of which two bodies having two cooperating bearing surfaces are supported for rotation relative to one another about an axis of rotation. At least one of the bearing surfaces of each of the bearings has patterns of helical grooves for building up pressure in a lubricant between the bearing surfaces during rotation. Further, the bearing system comprises a chamber which is arranged between the hydrodynamic bearings and which serves as a reservoir for an additional amount of lubricant. The chamber is bounded by two cylindrical wall portions. The two cylindrical wall portions off-set from each other to build up pressure in the lubricant in the chamber during rotation.

12 Claims, 2 Drawing Sheets

BEARING SYSTEM WITH ACTIVE RESERVOIR BETWEEN TWO AXIALLY SPACED HYDRODYNAMIC BEARINGS

BACKGROUND OF THE INVENTION

The invention relates to a bearing system comprising two axially spaced hydrodynamic bearings by means of which two bodies, which comprise cooperating bearing surfaces between which a lubricant is present are supported for rotation about an axis of rotation relative to each other, at least one of the bearing surfaces of each of the bearings being formed with an inner pattern and an outer pattern of helical grooves, which two patterns of grooves act in opposite directions to build up a pressure in the lubricant between the bearing surfaces, during rotation of the bearing system in the direction for which the bearing System is intended, which bearing system further comprises a chamber which is situated between said hydrodynamic bearings, which serves as a reservoir for an additional amount of lubricant, and which is bounded by two cylindrical wall portions of said bodies.

Such a bearing system is known from U.S. Pat. No. 4,596,474 herewith incorporated by reference. The known bearing system is used in a construction comprising a rotatable cylindrical shaft and a stationary bearing housing. Between the two radial hydrodynamic bearings a gap is formed which functions as a reservoir for a spare amount of lubricant. The gap is situated between two concentric wall portions, one of the wall portions being a part of the shaft and the other wall portion being defined by an annular recess in the bearing housing. One of the two concentric wall portions is formed with two patterns of feed grooves for feeding lubricant towards the bearings during operation.

During rotation of the known bearing system in the direction for which the system is intended the lubricant in the bearings is massed up by the inner and outer patterns of grooves which cooperate as a fishbone pattern, to build-up pressure in the lubricant for a satisfactory hydrodynamic lubrication. In order to prevent this hydrodynamic action from being disturbed the bearings must always be provided with an adequate amount of lubricant, such as oil or grease. In the known bearing system this is achieved by providing an additional amount of lubricant in the gap between the bearings, from which gap the lubricant is pumped towards the bearings during operation.

In the known bearing system very small axial clearances between the two hydrodynamic bearings are not possible, because it is necessary that the feed grooves have a specific length for a correct operation of the patterns of feed grooves. A disadvantage of this is that the known bearing system cannot be used in constructions where the bearings must be closely spaced, for example in view of the available construction length.

SUMMARY OF THE INVENTION

It is the object of the invention to improve the bearing system of the type defined in the opening paragraph in such a way that a bearing system is obtained in which the bearings can be arranged at a very small distance from one another.

To this end the bearing system in accordance with the invention is characterized in that the two cylindrical wall portions bounding the chamber are off-set radially from one another to build-up pressure in the lubricant in the chamber during rotation of the bearing system in the direction for which the system is intended.

During operation a wedge effect will arise in the chamber of the bearing system in accordance with the invention, which effect results in a pressure build-up in the lubricant in the chamber. This build-up is obtained over the entire axial clearance between the bearings, so that lubricant is driven towards the bearings and the bearings are constantly supplied with lubricant. This yields a bearing system which also in the case of a very narrow reservoir is very effective and reliable.

During operation the pressure build-up in the reservoir of the bearing system in accordance with the invention takes place mainly in the lubricant present in that part of the chamber where it has the smallest radial dimensions. This results in forced circulation of the lubricant in the entire bearing system. Thus, in effect, the lubricant in the bearings is constantly replenished, which may substantially retard the aging process of the lubricant, in particular when the lubricant is a grease.

It is to be noted that the motion of lubricant towards the bearings in the bearing system in accordance with the invention is found to be attended with less frictional losses than when this motion is obtained by means of the construction in accordance with the aforementioned U.S. Pat. No. 4,596,474. This means that the bearing system in accordance with the invention has a better efficiency than the known bearing system.

A preferred embodiment of the bearing system in accordance with the invention is characterized in that one of the bodies is formed with a vent which terminates in the chamber in an area with a larger radial clearance between the cylindrical wall portions, in which area no pressure is built up during rotation. The vent ensures that the air pressure in the chamber is constant as desired to prevent the lubricant in the bearing from being forced out, for example, as a result of temperature variations.

The invention also relates to an electrical machine provided with the bearing system in accordance with the invention, in which the two bodies of the bearing system comprise a bearing bush of the electrical machine and a machine shaft which engages the bearing bush.

BRIEF DESCRIPTION OF THE DRAWINGS

Embodiments of the invention will now be described in more detail, by way of example, with reference to the accompanying drawings, in which.

DETAILED DESCRIPTION OF THE PREFERRED EMBODIMENT

Figure 1:
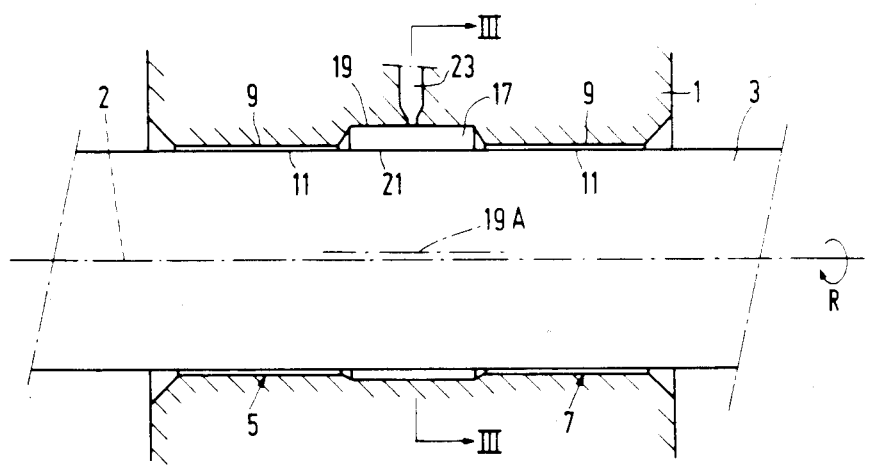
FIG. 1 is a schematic longitudinal sectional view, not in scale, of an embodiment of the bearing system in accordance with the invention.
Figure 2:
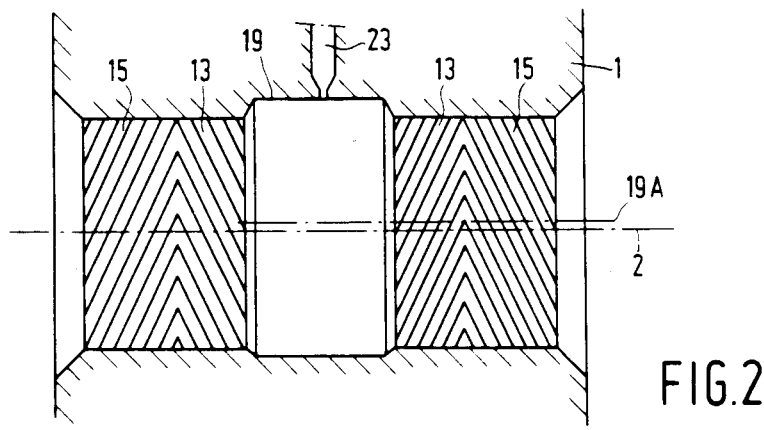
FIG. 2 is a sectional view similar to that of FIG. 1, but with one body removed.
Figure 3:
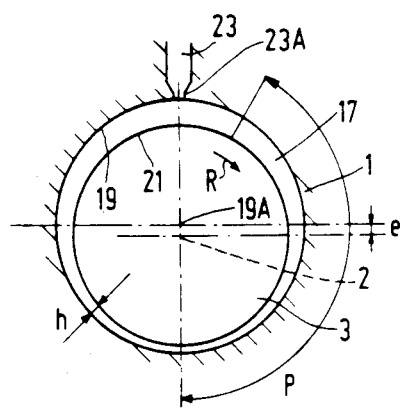
FIG. 3 is a sectional view taken on the line III—III in FIG. 1.

The bearing system in accordance with the invention shown in FIGS. 1, 2 and 3, comprises a stationary body, comprising a bearing housing 1, and a rotatable body, comprising a cylindrical shaft 3, which is rotatable about an axis of rotation 2. The bearing housing 1 is made of bronze and forms part of the electric motor shown in FIG. 4. The shaft 3 is made of steel and is journalled in a bearing housing 1 by means of two radial hydrodynamic bearings 5 and 7 arranged in line. The bearings are each provided with a lubricant, not shown, which may be a grease or an oil.

The bearing housing 1 has two cylindrical bearing surfaces 9, which are disposed opposite two cylindrical bearing surfaces 11 of the shaft 3. In the bearing surfaces 9 of the bearing housing 1 two patterns 13 and 14 of shallow helical grooves are formed at the locations of the bearings 5 and 7, the grooves in the present example having a depth of 12 μm. In the bearings 5 and 7 the grooves of the inner pattern 13 are oriented oppositely to the grooves of the pattern 15, in such a way that as the shaft 3 rotates in the direction indicated by the arrow R each pair of patterns 13 and 15 forces lubricant in an opposite direction, so that a hydrodynamic pressure is built up in the lubricant in the bearings 5 and 7.

The bearing system in accordance with the invention further comprises a chamber 17, which serves as a reservoir for an additional amount of lubricant. The chamber 17 which, viewed in the axial direction extends between the bearings 5 and 7, is enclosed between two eccentric cylindrical wall portions, namely a cylindrical wall portion 19 of the bearing housing and a cylindrical wall portion 21 of the shaft 3. The cylindrical wall portion 19 has a central axis 19A, which extends parallel to the axis of rotation 2 and which is slightly offset from the axis of rotation 2 by a distance e. The cylindrical wall portion 21, which has a smaller circumferential length than the wall portion 19, has a central axis which coincides with the axis of rotation 2. As a result of this the chamber 17 has the form of an annular gap of variable radial gap height h, so that during rotation of the shaft 3 in the direction indicated by the arrow R pressure is built up in the lubricant in the area in the chamber 17 which substantially corresponds to the area indicated by the arrow P.

In a practical embodiment, which yields very favourable results, the minimum gap height is 50 μm and the maximum gap height is 0.5 mm. Further experiments have shown that the bearings can be arranged at a very short distance from one another, enabling an axial clearance between the bearings of approximately 1 mm to be obtained.

The bearing housing 3 is formed with a vent 23 which terminates in the chamber 17. Obviously, the vent 23 is positioned in such a way that the aperture 23A of the vent 23 is situated in an area where no pressure is built up. The vent 23 may also be used for filling the chamber 17 with lubricant.

The patterns 13 and 15 in the bearings 5 and 7 are dimensioned in such a way relative to each other and relative to the chamber 17 that the maximum pressure built up by the outer pattern 15 is higher than the pressure built up in the reservoir and the patterns 13 together. This is to prevent lubricant from being pumped out of the bearing system.

Figure 4:
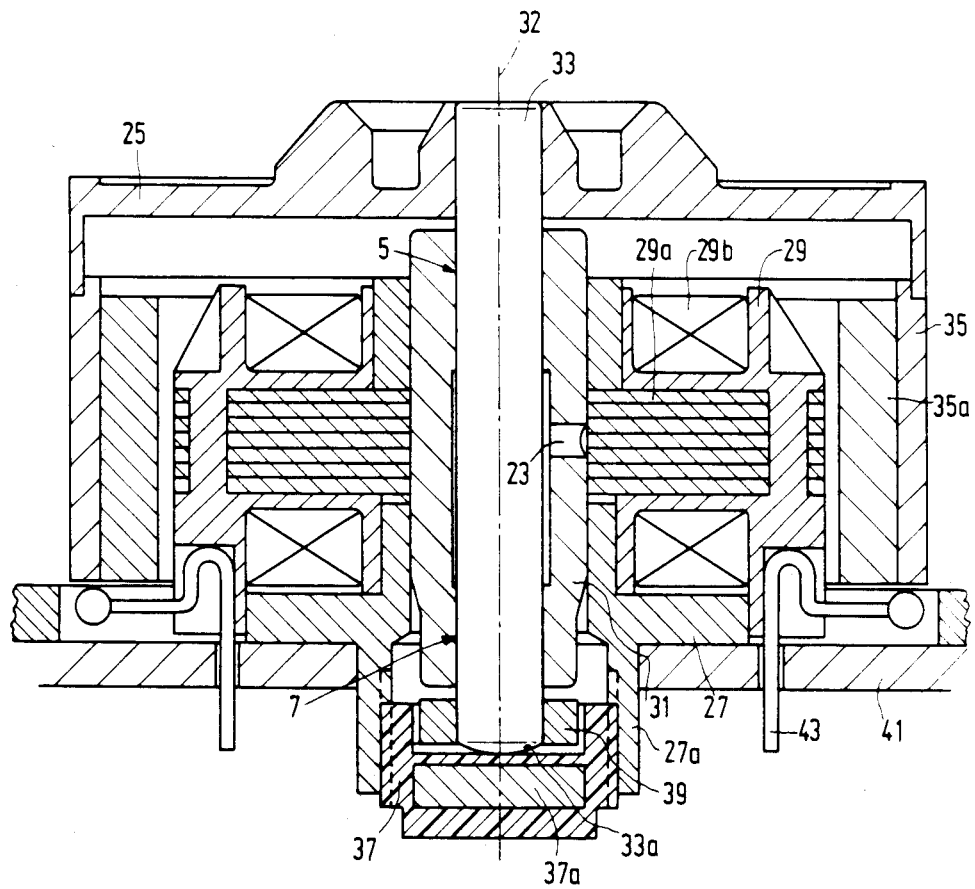
FIG. 4 is a cross-sectional view of an electric motor in which the embodiment shown in FIG. 1 is used.

The electrical machine in accordance with the invention shown in FIG. 4 comprises a bearing system of a type as shown in FIGS. 1, 2 and 3. The electrical machine is constructed as a brushless d.c. motor and may be employed in an optical disc player, not shown, for example a portable Compact Disc player, for driving a turntable 25. The motor comprises a frame 27 with a stator 29 provided with a lamination core 29a and coils 29b. A motor shaft 33, which is rotatable about an axis of rotation 32, extends through a bearing bush 31 which is mounted in the frame 27 with a suitable interference fit.

The motor shaft 33 is journalled in the bearing bush 31 by two radial hydrodynamic bearings 5 and 7. A chamber 17 containing an amount of lubricant situated between the bearings 5 and 7, the chamber being formed with a vent 23. For a comprehensive description of the construction and the operation of the bearings 5 and 7 and the chamber 17 reference is made to the part of the above description relating to FIGS. 1, 2 and 3. For completeness' sake it is to be noted in this respect that the bearing bush 31 and the motor shaft 33 respectively correspond to the bearing housing 1 and the cylindrical shaft 3 of the bearing system shown in FIGS. 1, 2 and 3.

A cylindrical rotor 35 and the said turntable 25 are non-rotably secured to the motor shaft 33, the rotor 35 in the present embodiment being secured to the rotor shaft 33 via the turntable 25. In its interior the rotor 35 comprises a cylindrical radially magnetised permanent rotor magnet 35a.

The rotor shaft 33 is axially supported by means of a thrust bearing 37 comprising a bearing element 37a made of a wear-resistant plastics. At its side which faces the motor shaft 33 the bearing element 37a is provided with a layer of a plastics which cooperates with a bearing portion 33a of the rotor shaft 33. The bearing 37 is formed with an external screwthread and can be screwed into an internally threaded cylindrical portion 27a of the metal frame 27. The motor shaft 33 is urged against the thrust bearing 37 by magnetic force. This magnetic force acts between the bearing element 37a, which is constructed as an axially magnetised permanent magnet, and a ring 39 of a ferromagnetic material which is clamped onto the rotor shaft 33.

The frame 27 further carries a printed circuit board 41 with a printed-circuit pattern and electronic components, not shown, for the purpose of electrical commutation and motor control. Further, there are provided anchorage pins 43 which project through the printed circuit board 41 and which are electrically connected to the printed circuit pattern and to the coils 29b.

Obviously the scope of the invention is not limited to the embodiment described herein; for example two bearings of different dimensions may be used or the shaft may be stationary and the bearing housing may be rotatable.

What is claimed is:

1. A liquid-lubricated bearing system, comprising:
   an outer body;
   a shaft rotatable relative to said outer body about an axis of rotation;
   a pair of axially spaced hydrodynamic bearings comprising cooperating bearing surfaces on said shaft and said outer body, one of the bearing surfaces of each hydrodydnamic bearing having a pattern of bearing grooves for building up pressure in a liquid lubricant present between said bearing surfaces during bearing operation for centering and supporting said shaft in said housing; and
   a single annular reservoir between said hydrodynamic bearings for storing said liquid lubricant comprising a pair of opposing cylindrical wall portions of said shaft and said housing, one cylindrical wall portion being eccentric with said axis of rotation or defining a variable radial gap between said cylindrical wall portions such that for relative rotation of said shaft and housing said cylindrical wall portions cooperate to increase pressure in the liquid lubricant in the region where said variable gap is the smallest for pumping said liquid lubricant in an axial direction to said hydrodynamic bearings.

2. A bearing system as claimed in claim 1, wherein said pattern of bearing grooves comprises an inner pattern of grooves closest to the reservoir for forcing said lubricant away from said reservoir and an outer pattern of grooves for forcing said lubricant towards said reservoir for building up said pressure in said lubricant.

3. A bearing system as claimed in claim 2, wherein said inner and outer pattern of grooves of said pair of hydrodynamic grooves are dimensioned relative to each other such that during bearing operation the pressure built up by the outer patterns of grooves is higher than the pressure built up by the reservoir and the inner patterns of groves for preventing lubricant from being pumped out of the bearing system.

4. A bearing system as claimed in claim 3, wherein air is present in said reservoir in addition to said liquid lubricant and an area of relative low pressure is maintained in the region of the largest dimension of said variable gap during bearing operation; and said outer body has said eccentric cylindrical wall portion and further comprises a vent for equalizing the air pressure in said reservoir with the air pressure exterior to the bearing system, said vent terminating in said reservoir in the region of the eccentric wall portion furthest from said axis of rotation whereby said low pressure area is stationary relative to said vent.

5. A bearing system as claimed in claim 3, wherein air is present in said reservoir during bearing operation in addition to said liquid lubricant and an area of relative low pressure is maintained in the region of the largest dimension of said variable gap during bearing operation; and said shaft has said eccentric cylindrical wall portion and further comprises a vent for equalizing the air pressure in said reservoir with the air pressure exterior to the bearing system, said vent terminating in said reservoir in the region of the eccentric wall portion nearest said axis of rotation whereby said low pressure area is stationary relative to said vent.

6. An electrical machine provided with a bearing system as claimed in claim 5, characterized in that the housing of the bearing system comprises a bearing bush of the electrical machine and the shaft of the bearing system comprises the shaft of the electrical machine which engages the bearing bush.

7. A bearing system as claimed in claim 1, wherein air is present in said reservoir in addition to said liquid lubricant and an area of relative low pressure is maintained in the region of the largest dimension of said variable gap during bearing operation; and said outer body has said eccentric cylindrical wall portion and further comprises a vent for equalizing the air pressure in said reservoir with the air pressure exterior to the bearing system, said vent terminating in said reservoir in the region of the eccentric wall portion furthest from said axis of rotation whereby said low pressure area is stationary relative to said vent.

8. An electrical machine provided with a bearing system as claimed in claim 7, characterized in that the housing the bearing system comprise a bearing bush of the electrical machine and the shaft of the bearing system comprises the shaft of the electrical machine which engages the bearing bush.

9. A bearing system as claimed in claim 1, wherein air is present in said reservoir in addition to said liquid lubricant and an area of relative low pressure is maintained in the region of the largest dimension of said variable gap during bearing operation; and said shaft has said eccentric cylindrical wall portion and further comprises a vent for equalizing the air pressure in said reservoir with the air pressure exterior to the bearing system, said vent terminating in said reservoir in the region of the eccentric wall portion nearest said axis of rotation whereby said low pressure area is stationary relative to said vent.

10. A bearing system as claimed in claim 1, wherein the minimum dimension of said variable gap is 50 $\mu$m, the maximum gap dimension is 0.5 mm, and the axial distance between said hydrodynamic bearings is 1 mm.

11. A bearing system as claimed in claim 10, wherein the depth of said bearing grooves is 12 $\mu$m.

12. An electrical machine provided with a bearing system as claimed in claim 1, characterized in that the housing of the bearing system comprises a bearing bush of the electrical machine and the shaft of the bearing system comprises the shaft of the electrical machine which engages the bearing bush.

* * * * *